(12) United States Patent
Blake et al.

(10) Patent No.: US 10,619,769 B2
(45) Date of Patent: Apr. 14, 2020

(54) FLUID CONNECTOR WITH PRE-POSITIONED CRIMPING COLLAR

(71) Applicant: SARTORIUS STEDIM FMT SAS, Aubagne (FR)

(72) Inventors: Florian Blake, La Ciotat (FR); Jeremy Gibelin, Le Beausset (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 460 days.

(21) Appl. No.: 15/323,804

(22) PCT Filed: Jun. 29, 2015

(86) PCT No.: PCT/FR2015/051754
§ 371 (c)(1),
(2) Date: Jan. 4, 2017

(87) PCT Pub. No.: WO2016/001550
PCT Pub. Date: Jan. 7, 2016

(65) Prior Publication Data
US 2017/0138518 A1 May 18, 2017

(30) Foreign Application Priority Data
Jul. 4, 2014 (FR) ..................... 14 56494

(51) Int. Cl.
*F16L 13/14* (2006.01)
*F16L 33/207* (2006.01)
*F16L 33/22* (2006.01)

(52) U.S. Cl.
CPC ......... *F16L 13/146* (2013.01); *F16L 33/2071* (2013.01); *F16L 33/2076* (2013.01); *F16L 33/225* (2013.01); *Y10T 29/49908* (2015.01)

(58) Field of Classification Search
CPC ... F16L 13/141; F16L 13/146; F16L 33/2071; F16L 33/2076; F16L 33/225; F16L 33/227
(Continued)

(56) References Cited

U.S. PATENT DOCUMENTS

| 4,453,746 A | 6/1984 | Keenan |
| 5,094,493 A | 3/1992 | Sauer |

(Continued)

FOREIGN PATENT DOCUMENTS

| DE | 38 15 168 A1 | 11/1989 |
| DE | 20 2004 015244 U1 | 1/2005 |

(Continued)

OTHER PUBLICATIONS

International Search Report, dated Oct. 14, 2015, from corresponding PCT application.

*Primary Examiner* — Zachary T Dragicevich
(74) *Attorney, Agent, or Firm* — Young & Thompson (57) ABSTRACT

A fluid connection set includes a connector (1), a flexible hose (2), and a crimping collar (5) for fixing the front end of the flexible hose to the connector, the connector including a connector body (10), a tubular nozzle (3), the tubular nozzle including retaining radial projections (31) of the hose as well as a clamping area (30) of the hose, and a temporary accommodation space (4), arranged between the tubular nozzle (3) and the connector body (10), for housing the collar during the operation of inserting the flexible tube, after which the collar is moved with respect to the clamping area and then crimped.

20 Claims, 4 Drawing Sheets

(58) Field of Classification Search
USPC .................................................. 285/256, 382
See application file for complete search history.

(56) References Cited

U.S. PATENT DOCUMENTS

| | | | | |
|---|---|---|---|---|
| 6,715,800 | B1* | 4/2004 | Hennig | F16L 33/225 |
| | | | | 285/256 X |
| 2006/0071470 | A1 | 4/2006 | Meyer et al. | |
| 2006/0097518 | A1* | 5/2006 | Bott | F16L 13/141 |
| | | | | 285/382 |
| 2007/0108760 | A1* | 5/2007 | McKay | F16L 13/146 |
| | | | | 285/256 |
| 2011/0109084 | A1* | 5/2011 | Bonhag | F16L 13/146 |
| 2015/0167874 | A1* | 6/2015 | Buerli | F16L 33/225 |

FOREIGN PATENT DOCUMENTS

| | | |
|---|---|---|
| GB | 2 049 856 A | 12/1980 |
| JP | H02 203098 A | 8/1990 |

* cited by examiner

FLUID CONNECTOR WITH PRE-POSITIONED CRIMPING COLLAR

BACKGROUND OF THE INVENTION

Field of the Invention

The invention relates to fluid connectors, in particular for fluid connections allowing connecting a connector to a flexible pipe, in the field of biopharmaceutical applications.

More precisely, in the biopharmaceutical field, flexible pipes or hoses are used, and receptacles or containers, used for transporting and containing various biopharmaceutical substances, often with necessary aseptic precautions.

In biopharmaceutical applications, such flexible pipes or hoses allow circulation, passage, communication of a fluid, such as a biopharmaceutical fluid and may be connected either to a similar flexible hose or to a container, which may also be rigid or flexible, via a connector, which is commonly rigid and for example developed in plastic and/or in metal.

A hose like the one to which the invention applies, usually with a circular section, is typically developed in plastic matter such as silicone, thermoplastic elastomers (TPE), but also PVC, the list not being exhaustive. It has a certain self-supporting ability and, simultaneously, both a certain set flexibility and a certain local flexibility, which allows, under the application of a sufficient force, deforming substantially radially the hose, for example for engaging it on parts of a connector with a diameter larger than a diameter of the hose at rest.

In a typical development, for example, the hose has an outer diameter comprised between for example 6 millimetres and 40 millimetres, the thickness depending on the material, the diameter, and the applications.

A connector like the one to which the invention applies, commonly also with a circular section, includes a tubular nozzle ended by an open end and on which an open front end of the hose may be engaged.

Furthermore, the connector, and specifically the tubular nozzle of the connector, usually includes, starting from the open end of the connector according to the axis of said connector, retaining radial projections also named splines or hose barbs followed by a clamping area, which is for example substantially cylindrical. The retaining radial projections have an outer diameter larger than or equal to the inner diameter of the hose at rest. Thus they deform the flexible hose and allow ensuring sealing and minimum restraint of the flexible hose with respect to the connector.

Description of the Related Art

In the known art, to fix such flexible hose to such connector, the following procedure is performed. First of all, the open front end of the hose is engaged on the tubular nozzle of the connector so that the front end of the hose surrounds the tubular nozzle of the connector in particular at the location of the retaining radial projections as well as the clamping area. Then, a clamping collar is brought from the back of the hose to the front end of the hose and in particular to the clamping area. Finally, collar clamping is performed. The clamped collar applies an inward radial pressure which is sufficient for maintaining the flexible hose on the nozzle in order to, on one hand ensure that the hose is properly sealed with respect to the nozzle, and on the other hand prevent that a pull force on the hose might lead to a disengagement of the hose from the nozzle.

In cases of such clamping collars, a metallic collar may for example be used in the form of a preformed ring provided with one or two lugs (e.g. ears) protruding outward relative to the general shape of the collar ring, this type of collar is sometimes called Oetiker® collar. After inserting the collar on the hose to maintain, with the use of a tool, clamping is performed on the collar lug (or lugs) which causes a remaining deformation and thus narrowing of the main diameter of the ring and consequently clamping the collar on the hose. This type of clamping with a metallic ring is particularly robust and reliable.

However, for some application types, the singularity of radial pressure at the lug (or lugs) makes the sealing pressure non-homogeneous on the circumference. And in this case it is preferable to use a 'Multi-crimp Ring' (MCR) type of collar which is a cylindrical ring generated by revolution which may be radially compressed inward to reduce its diameter by a few percents, in practice for fixing the order of magnitude between 2% and 30%, preferably between 2% and 15%, reducing the diameter being produced in a homogeneous way on its entire circumference. Thus no singularity in radial pressure is created, which improves the sealing and clamping function. The obtained sealing homogeneity is better with little/small diameter decrease. Also the esthetics of the collar is better for a smaller diameter decrease, as this reduces the wavelets produced on the surface of the crimped ring.

In the known art, for bringing such collars from the back of the hose to the front end of the hose and in particular to the superimposition area between the hose and the connector it is therefore necessary to make the collar pass above the retaining radial projections, which implies choosing a collar having an inner diameter large enough for this. This constraint is contradictory, in cases of Multi-crimp Rings (MCR), as indicated above with little diameter decrease, which is a factor of homogeneity guarantee.

Indeed, in the known art, before collar crimping, there is then a relatively important clearance between the inner diameter of the collar and the outer diameter of the hose at the location of the clamping area. Cancelling this clearance and effectively clamping the collar may cause scars on the hose or even more serious damage, which may cause a leak or a sterilisation loss detrimental to the biopharmaceutical application.

Consequently there is a need to propose an improvement intended for overcoming, at least partly, the above-mentioned disadvantage of the previous known art.

BRIEF SUMMARY OF THE INVENTION

Below, a disclosure of the invention such as characterised in the claims.

A fluid connection set is thus proposed comprising a connector, a flexible hose with an open front end, and a crimping collar for fixing the front end of the flexible hose to the connector, the connector comprising:
  a connector body,
  a tubular nozzle able to receive the front end of the hose, the tubular nozzle including one or more retaining radial projections of the hose as well as a clamping area of the hose, and
  a temporary accommodation space, arranged between the tubular nozzle and the connector body, wherein
  the front end of the hose is engaged on the tubular nozzle, in order to circumferentially surround the retaining radial projections and at least part of the clamping area, the front end of the hose has a first outer diameter D1 at the location of the clamping area and a second outer diameter D2 at the location of the retaining radial projections, the first outer diameter D1 being smaller than the second outer diameter D2, the temporary accommodation space has a maximum radial size D3, and the collar at rest before crimping has an inner diameter D0, and wherein the first outer diameter D1 and the maximum radial size D3 are smaller than or equal to the inner diameter D0, and the second outer diameter D2 is larger than or equal to the inner diameter D0.

As a result, the temporary accommodation space thus defined allows at least partially housing the collar before inserting the hose which allows choosing a diameter D0 closer to D1, even if the retaining projections are relatively thick.

According to a development, the first outer diameter D1 and the inner diameter D0 may be substantially close, and preferably a gap between the first outer diameter D1 and the inner diameter D0 is smaller than 15% of the inner diameter D0, and preferably smaller than 10% of the inner diameter D0, or even more preferably smaller than 5% of the inner diameter D0.

D0 and D1 therefore verify the relation $$1 < \frac{D0}{D1} < 1.15, \text{ or } 1 < \frac{D0}{D1} < 1.1,$$

or even $$1 < \frac{D0}{D1} < 1.05,$$

due to which the diameter decrease during the crimping operation is little and thus the waves or wrinkles on the surface of the ring and also the hose are reduced.

According to a development, a flange ring is provided for separating the temporary accommodation space from the connector body, the flange ring having a first outer diameter D4 larger than the inner diameter D0; in order to limit the forward travel of the collar with respect to the connector.

According to a development, the temporary accommodation space has an axial length L1 larger than or equal to an axial length L0 of the collar; in order to be capable of completely accommodating the collar.

According to a development which is an alternative to the previous one, the temporary accommodation space has an axial length L1 smaller than an axial length L0 of the collar; due to which, the temporary accommodation space allows housing the collar in a cantilever position, and the front end of the tube may be slid under the cantilever part of the collar during the operation of tube insertion. The axial compactness of the connector may the thus be improved.

For example L1=90% of L0, or L1=75% of L0, or even L1=50% of L0 may be chosen.

According to a development, the temporary accommodation space is separated from the clamping area by an axillary flange ring having a fifth outer diameter D5 larger than the maximum radial size D3 of the temporary accommodation space and smaller than the inner diameter D0; due to which, a gravity catch is formed allowing axial retention of the collar in the annular groove due to gravity.

According to a development, the maximum radial size D3 of the temporary accommodation space is larger than or equal to the first outer diameter D1, a natural, thick, and robust abutment is thus first formed limiting the flexible tube insertion.

According to a development, the temporary accommodation space may comprise one or more beads which can be in contact with the collar; retention by collar friction is then provided on the accommodation space.

According to a development, the beads define a maximum radial size D3 substantially equal to the inner diameter D0; which allows easily positioning the collar in the accommodation space, and then moving toward the clamping area.

According to development, the clamping area has an axial length L2 larger than or equal to an axial length L0 of the collar and is ended at a first axial end by the retaining radial projections and at a second axial end by an abutting axial shoulder of the hose. Due to which, quality crimping on a sufficient length allows guaranteeing good sealing.

According to a development, the collar is preferably metallic and the collar is either a multi-crimp collar or a lug collar. This forms a robust and sustainable solution.

According to a second aspect of the present invention, there is proposed a method of fixing in a sealed manner a flexible hose to a connector is proposed with the use of a crimping collar, wherein:

the following is provided a flexible hose with an open front end, a connector comprising a connector body, a tubular nozzle able to receive the front end of the hose, the tubular nozzle including retaining radial projections of the hose as well as a clamping area of the hose, and a temporary accommodation space, arranged between the tubular nozzle and the connector body, and having a maximum radial size D3, and a crimping collar for fixing the front end of the flexible hose to the connector, the collar at rest before crimping having an inner diameter D0, the collar is engaged around the connector by the tubular nozzle until the collar circumferentially surrounds at least partly the temporary accommodation space, the front end of the hose is engaged around the tubular nozzle of the connector until said front end circumferentially surrounds the retaining radial projections and at least part of the clamping area, the front end of the hose having a first outer diameter D1 at the location of the clamping area and a second outer diameter D2 at the location of the retaining radial projections, the first outer diameter D1 being smaller than the second outer diameter D2, the first outer diameter D1 and the maximum radial size D3 being smaller than or equal to the inner diameter D0, and the second outer diameter D2 being larger than or equal to the inner diameter D0, the collar or the connector is moved in order to position the collar around at least part of the front end of the hose and substantially opposite to the clamping area of the connector, and the collar is crimped for fixing the open front end of the flexible hose to the connector. Due to which, assembling and crimping are developed simply and in a reliable way, either by automatic means or by manual means.

Preferably, the collar is engaged around the connector prior to engaging the front end of the hose on the tubular nozzle.

According to a development, the collar is engaged around the connector by means of a jaw,
  the jaw maintains the collar substantially coaxial with the temporary accommodation space of the connector while the front end of the hose is being engaged on the tubular nozzle, and
  the collar or the connector is moved in order to position the collar around at least part of the front end of the hose and substantially opposite the clamping area of the connector by means of the jaw.

According to a development, the collar is a multi-crimp metallic collar, in particular a collar without lugs.

BRIEF DESCRIPTION OF THE DRAWINGS

The drawing figures will now briefly be described.

DETAILED DESCRIPTION OF THE PREFERRED EMBODIMENTS

Below a detailed disclosure of several embodiments of the invention accompanied with examples and references to the drawings.

In the illustrated example, it is a fluid connection set 100 comprising a connector 1 to which a flexible hose 2 is connected in a fluid-sealed way. The connector 1 is for example itself connected to a biopharmaceutical product container or another hose.

The flexible hose 2 may be generally defined as a wall 20 delimiting a fluid space 21. The flexible hose 2 includes an open front end 2a and extends from the front end 2a backward through a substantially cylindrical section and in particular cylindrical generated by revolution. The flexible hose 2 may include a back end (non-represented), which is for example open and connected to a biopharmaceutical product container or another connector.

The connector 1 comprises a tubular nozzle 3 ended by an open end 3a as well as a connector body 10. The tubular nozzle 3 is for example axisymmetric around an A-A axis. The connector body 10 may also be substantially axisymmetric around the A-A axis. The connector body 10 may thus be placed at a second end 1a of the connector 1, for example an end 1a opposite the open end 3a. The second end 1a of the connector 1 is for example connected to a biopharmaceutical product container or a hose (not shown) for allowing a transfer of biopharmaceutical fluid with the flexible hose 2.

Figure 1:
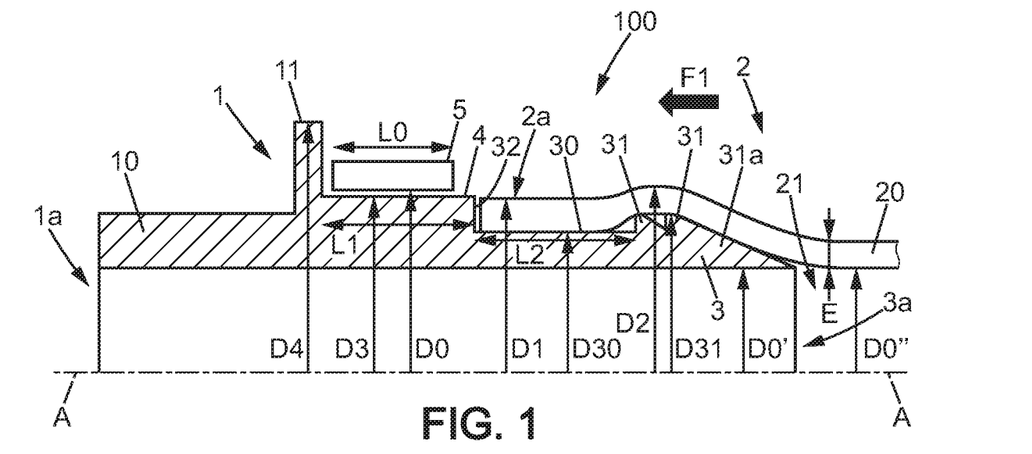
FIG. 1 is an axial cross-sectional view of a fluid connection set according to a first embodiment of the invention, during the implementation of a method according to the invention for fixing in a sealed manner a flexible hose to a connector with the use of a collar, wherein the front end of the hose is engaged on the tubular nozzle, in order to circumferentially surround the retaining radial projections and at least part of the clamping area, and the clamping collar circumferentially surrounds the temporary accommodation space.

As illustrated in FIG. 1 for example, the tubular nozzle 3 is able to receive, and be fixed to, the front end 2a of the hose 2.

For this purpose, the tubular nozzle 3 includes retaining radial projections 31 of the hose 2.

The retaining radial projections 31, also named splines or hose barbs, have for example a general shape of a truncated cone with a central opening bore, the truncated cone bore shape having in particular one smaller diameter directed toward the open end 3a of the tubular nozzle 3. In an advantageous manner, one end retaining radial projection 31a may be ended by the open end 3a of the tubular nozzle 3, so that the truncated cone bore shape of the end retaining radial projection 31a constitutes a progressive radial slope from the open end 3a.

The tubular nozzle 3 also includes a clamping area 30 of the hose 2. This clamping area 30 is in particular similar to a substantially smooth cylinder. The clamping area 30 is for example substantially coaxial with the tubular nozzle 3 and, where required, with the connector body 10. The clamping area 30 usually has a maximum outer diameter D30 smaller than the maximum outer diameter D31 of the retaining radial projections 31.

The clamping area 30 is ended at a first axial end by the retaining radial projections 31 and at a second axial end by an abutting axial shoulder 32 of the hose 2. The axial shoulder 32 is thus for example placed opposite the retaining radial projections 31 with respects to the A-A axis. The axial shoulder 32 allows limiting the forward travel of the flexible hose on the tubular nozzle 3. The axial shoulder 32 ends for example the tubular nozzle 3 on its axial end opposite the open end 3a.

Thus, in a sequential order according to the A-A axis starting from the open end 3a, the tubular nozzle 3 may include, first of all, the retaining radial projections 31 and then the clamping area 30 and finally the axial shoulder 32. The tubular nozzle 3 may however include additional elements, at the start, at the end, or in between the three elements mentioned above.

In the example of FIG. 1, the front end 2a of the hose 2 is mounted (arrow F1) on the tubular nozzle 3 in order to circumferentially surround the retaining radial projections 31 and part of the clamping area 30, substantially close to the entire clamping area 30, the front end 2a of the hose 2 thus comes near the axial shoulder 32.

It can be noticed that the inner diameter D0' of the tubular nozzle 3 may advantageously be substantially neighbouring the inner diameter D0" of the flexible hose 2 at rest. When the flexible hose 2 is engaged on the tubular nozzle 3, the end opening of the front end 2a of the hose 2 is radially deformed outwardly through the progressive radial slope of the end retaining radial projection 31a, remains deformed inward along the retaining radial projections 31, and then restores a narrower diameter at the clamping area 30.

In this configuration mounted on the tubular nozzle 3, the front end 2a of the hose 2 then has a first outer diameter D1 at the location of the clamping area 30 and a second outer diameter D2 at the location of the retaining radial projections 31. The first outer diameter D1 may in particular be smaller than the second outer diameter D2, as illustrated in FIG. 1.

The fluid connection set 100 further comprises a crimping collar 5 (crimping ring) for fixing the front end 2a of the flexible hose 2 to the connector 1. The collar allows applying a radial pressure on the hose end surrounding the tubular nozzle. This radial pressure has two objectives: the first is to ensure sufficiently effective sealing between the hose 2 and the tubular nozzle 3, and the second consists in mechanically maintaining the hose around the nozzle to prevent a pull force applied on the hose 2 from leading to disengagement of the hose from the tubular nozzle, the second objective being mainly reached through the geometric condition D31>D30.

The collar 5, when circumferentially surrounding the A-A axis has an axial length L0. Furthermore, the collar 5 at rest before crimping has an inner diameter D0.

In all the present description, "axial length" of an element refers to a total size of said element according to the A-A axis.

The collar 5 is in particular adapted for being clamped around the front end 2a of the hose 2 at the location where said front end 2a circumferentially surrounds the clamping area 30.

Thus, for allowing conveniently clamping the collar around the flexible hose 2, the clamping area 30 advantageously has an axial length L2 larger than or equal to the axial length L0 of the collar 5. Accordingly, it has an optimal clamping surface for a given collar.

According to considered embodiments, the collar 5, preferably metallic, may be a multi-crimp collar or a lug collar as detailed below relative to the different embodiments of the invention as presented.

The connector 1 also comprises a temporary accommodation space 4 which will now be described in more detail.

The temporary accommodation space 4 is for example arranged between the tubular nozzle 3 and the connector body 10, in particular between the axial shoulder 32 of the tubular nozzle 3 and the connector body 10.

In the example from the figures, the temporary accommodation space 4 is like a substantially smooth cylinder with an axial length L1 larger than or equal to the axial length L0 of the collar 5. The temporary accommodation space 4 has a maximum radial size D3 smaller than or equal to the inner diameter D0. Accordingly, the temporary accommodation space 4 may completely house the collar 5.

Figure 10:
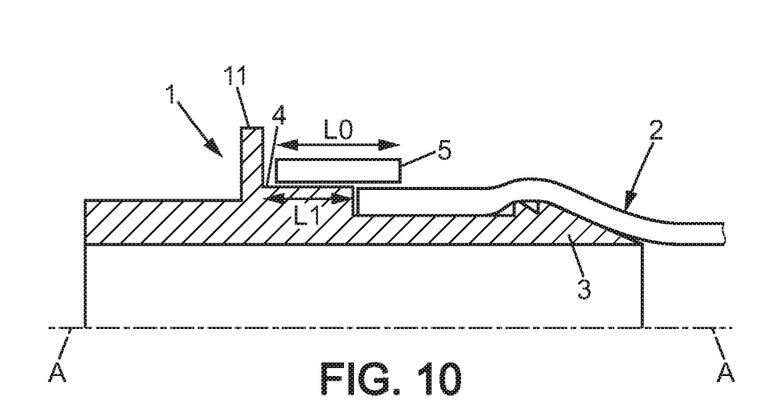
FIG. 10 is an axial cross-sectional view analogous to FIG. 1, with an accommodation space having a reduced axial length.

In a development variant represented in FIG. 10, the temporary accommodation space 4 may have an axial length L1 smaller than the axial length L0 of the collar 5. In this variant, the temporary accommodation space 4 advantageously has a maximum radial size D3 larger than or equal to the first outer diameter D1 of the hose 2 at the location of the clamping area 30. Accordingly, the collar 5 may be placed cantilevered on the temporary accommodation space 4 whereas the hose 2 is inserted on the tubular nozzle 3, and slid under the cantilevered portion of the collar 5 on hold.

Furthermore, the first outer diameter D1 of the hose 2 is smaller than or equal to the inner diameter D0 and the second outer diameter D2 of the hose 2 is larger than or equal to the inner diameter D0.

Accordingly, the temporary accommodation space 4 allows temporarily housing the collar 5 during the implementation of the method of clamping the flexible hose on the connector 1 and more precisely before inserting the hose 2 on the nozzle 3 as detailed below. This advantageously allows choosing a diameter D0 of the collar 5 at rest before crimping as close as possible to the first outer diameter D1 of the hose 2 at the location of the clamping area 30, even if the retaining projections 31 are relatively thick.

Thus for example the first outer diameter D1 and the inner diameter D0 may be chosen substantially close to each other. Preferably, a gap between the first outer diameter D1 and the inner diameter D0 may be smaller than 5% of the inner diameter D0, or smaller than 3%. Accordingly, diameter decrease of the collar during the clamping operation is small and the risk of causing waves or wrinkles on the surface of the hose during clamping of the collar is notably reduced.

Furthermore, as seen in FIG. 1, the connector 1 may include a connector body flange ring 11 separating the temporary accommodation space 4 from the connector body 10. The connector body flange ring 11 may in particular have a fourth outer diameter D4 larger than the inner diameter D0 of the collar 5. Accordingly, it is possible to limit the forward travel of the collar 5 with respect to the connector 1 according to the A-A axis.

In a first embodiment of the fluid connection set illustrated in FIGS. 1 to 5, the maximum radial size D3 of the temporary accommodation space 4 is larger than or equal to a first outer diameter D1. The collar 5 may then be temporarily placed on the temporary accommodation space 4 when inserting the hose 2. Then the collar is brought (arrow F2) around the front end 2a of the hose 2 at the location of the clamping area 30 easily by a simple translation without the need to axially centre the collar 5 on the connector 1. Then the collar 5 is pressed inward by crimping (arrow F3).

It can be noticed that when the collar 5 is held on the temporary accommodation space 4, the collar 5 is not located in the outer radial area of the nozzle 3, and the front end of the flexible hose may be pushed and guided by the fingers of an operator or a gripper of a manipulator, without disturbance caused by the collar, as it is axially located beyond the stop axial shoulder 32 for inserting the hose.

Figure 6:
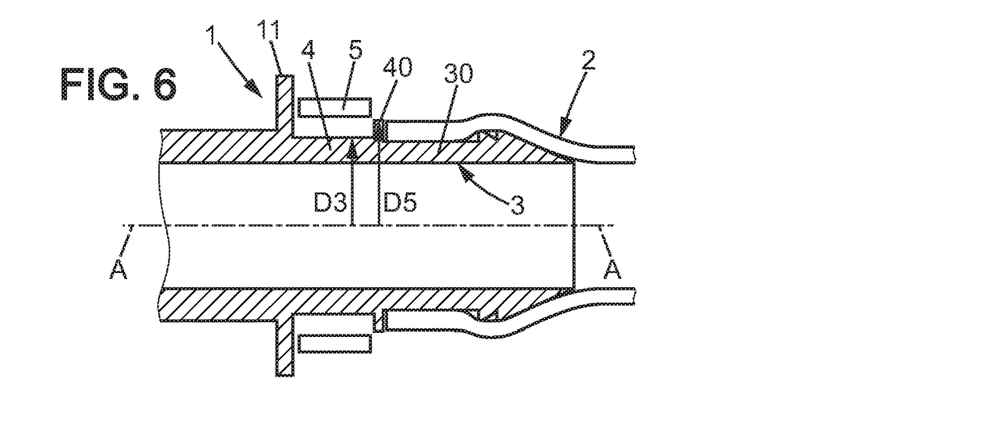
FIG. 6 is an axial cross-sectional view of a fluid connection set according to a second embodiment of the invention, during the implementation of a method according to the invention for fixing in a sealed manner a flexible hose to a connector using a collar.
Figure 7:
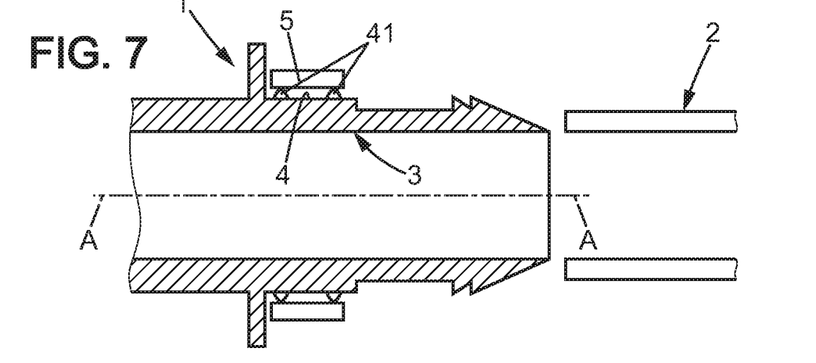
FIGS. 7, 8, and 9 are axial cross-sectional views is of a fluid connection set according to a third embodiment of the invention, during the implementation of a method according to the invention for fixing in a sealed manner a flexible hose to a connector using a collar.
Figure 8:
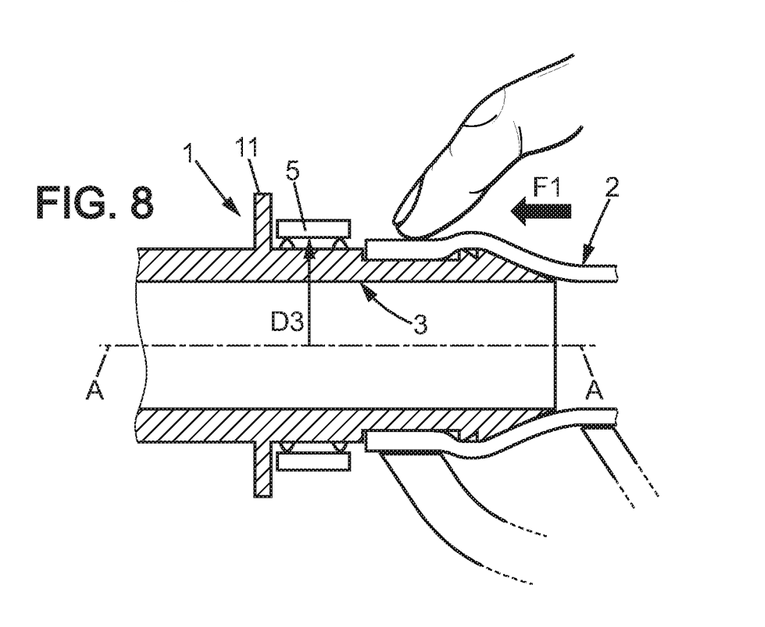
Figure 9:
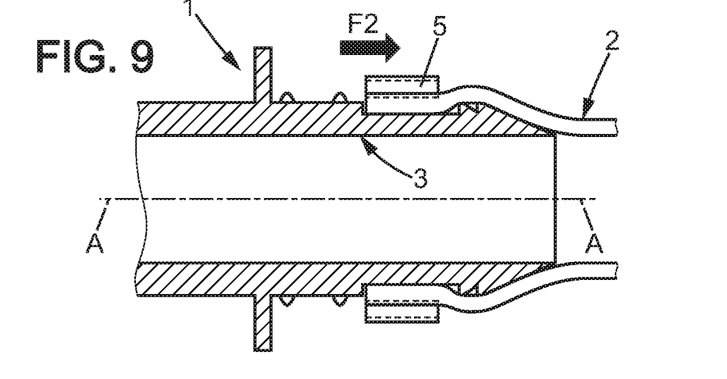

In a second and a third embodiment, illustrated in FIG. 6 and in FIGS. 7 to 9, respectively, the maximum radial size D3 of the temporary accommodation space is smaller than or equal to a first outer diameter D1. Accordingly, it is possible to temporarily retain the collar 5 on the temporary accommodation space 4 in particular in the way which will now be detailed.

Thus, in the second embodiment illustrated in FIG. 6, the temporary accommodation space is separated from the clamping area 30 by an auxiliary flange ring 40 having a fifth outer diameter D5 larger than the maximum radial size D3 of the temporary accommodation space. Furthermore, the fifth outer diameter D5 is smaller than the inner diameter D0 of the collar 5.

The auxiliary flange ring 40, combined where required with the connector body flange ring 11 separating the temporary accommodation space 4 from the connector body 10, allows axially retentioning the collar 5 in the temporary accommodation space 4. Indeed, the set composed by the auxiliary flange ring 40, the connector body flange ring 11, and the temporary accommodation space 4 form an annular groove wherein the collar 5 may be retained under the effect of gravity as illustrated in FIG. 6.

In a third embodiment illustrated in FIGS. 7 to 9, the temporary accommodation space 4 further comprises beads 41. The beads are able to be in contact with the collar 5 and allow maintaining the collar 5 substantially coaxial with the connector 1.

Thus, the beads 41 define a maximum radial size D3 which is substantially equal to the inner diameter D0 of the collar 5.

The maximum radial size D3 is furthermore advantageously larger than or equal to the first outer diameter D1. The collar 5 may then be temporarily placed on the beads 41 of the temporary accommodation space 4 and brought around the front end 2a of the hose 2 at the location of the clamping area 30 easily by a simple translation without the need to axially centre the collar 5 on the connector 1.

In a non-illustrated development variant, the temporary accommodation space 4 may have a noncircular section, in particular a polygonal section, for example hexagonal. Accordingly, the temporary accommodation space 4 may have additional functions, for example allowing gripping by a tool jaw for allowing screwing the connector on a retention. The temporary accommodation space 4 may also be formed by three (or more) radial projections having a free end which fits in a diameter having a dimension D3.

A method according to the invention allowing fixing in a sealed manner a flexible hose 2 to a connector 1 using a clamping collar 5 may thus be implemented for example in the following way.

First of all, the collar 5 is engaged around the connector 1 by the tubular nozzle 3 until the collar circumferentially surrounds the temporary accommodation space 4. The result of this step is for example illustrated in FIG. 7 for the case of the third embodiment.

Then, the front end 2a of the hose 2 is engaged on the tubular nozzle 3 of the connector 1 until said front end circumferentially surrounds the maintaining radial projections 31 and at least part of the clamping area 30. The configuration of FIGS. 1, 4, 6, and 8 is then obtained.

There too, it can be noticed that when the collar 5 is held on the temporary accommodation space 4, the collar 5 is not located in the outer radial area of the nozzle 3, and the front end of the flexible hose may be pushed (arrow F1) and guided by the fingers of an operator or a gripper of a manipulator, without disturbance caused by the collar, as it is axially located beyond the stop axial shoulder 32 for inserting the hose. In other words, the collar 5 does not radially cover the space 30 provided for receiving the hose end.

As mentioned above, the front end 2a of the hose thus has a first outer diameter D1 at the location of the clamping area 30 and a second outer diameter D2 at the location of the retaining radial projection 31.

In an advantageous way, the first outer diameter D1 is smaller than the second outer diameter D2, in order to guarantee minimum restraint of the hose on the connector.

Furthermore, in this configuration, the first outer diameter D1 and the maximum radial size D3 are advantageously smaller than or equal to the inner diameter D0, and that second outer diameter D2 is advantageously larger than or equal to the inner diameter D0. Accordingly, the collar has a diameter close to the first hose diameter and may nevertheless be housed on the temporary accommodation space. The method of clamping is simplified and has low risks of damaging the hose during the collar clamping.

Figure 2:
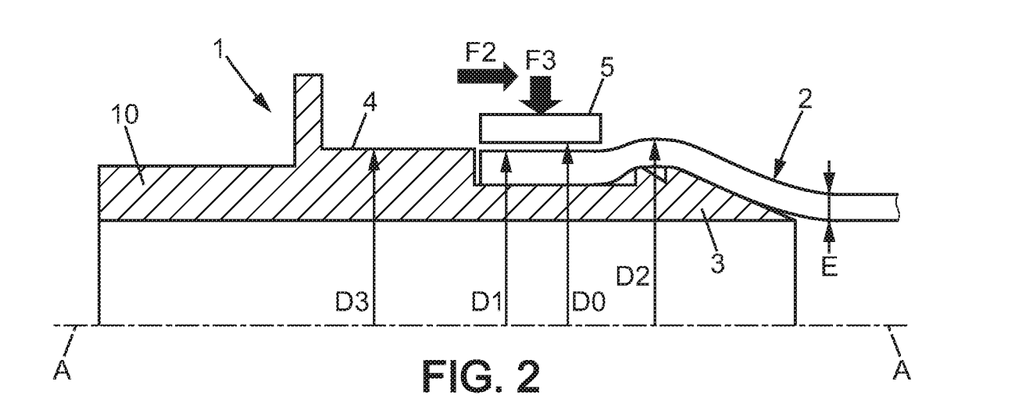
FIG. 2 is an axial cross-sectional view of the fluid connection set of FIG. 1, wherein the collar is placed around the front end of the hose and substantially opposite the clamping area of the connector.
Figure 5:
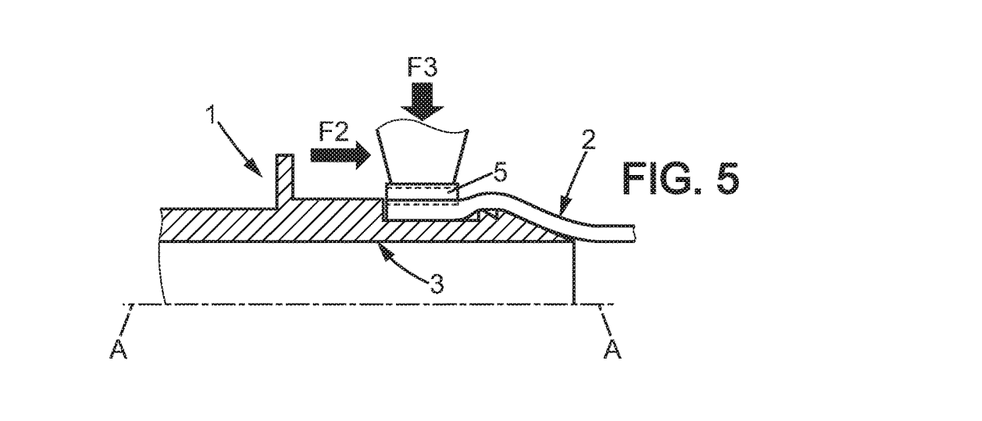
FIG. 5 is an axial cross-sectional view of the fluid connection set of FIG. 4, wherein the collar or the connector is moved with its tube inserted in order to place the collar around at least part of the front end of the hose and substantially opposite the clamping area of the connector by means of the jaw, and then the collar is crimped (in dotted lines).

In a later step, the collar 5 is moved (arrow F2) toward the open end 3a of the tubular nozzle 3 for placing it around at least part of the front end 2a of the hose substantially with regard to the clamping area 30 of the connector as illustrated in FIGS. 2, 5, and 9.

Alternatively, the collar 5 may be maintained at a fixed position and the connector 1 together with its flexible tube 2 inserted therein is then moved.

Figure 3:
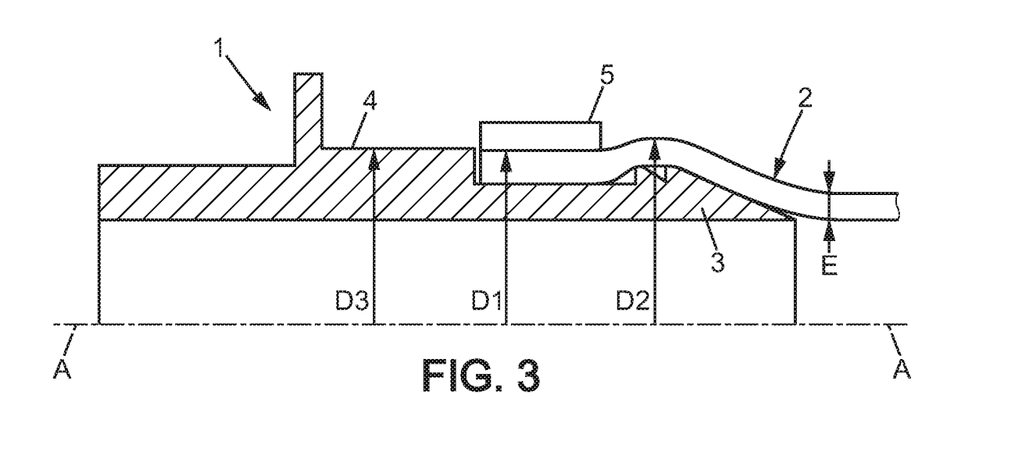
FIG. 3 is an axial cross-sectional view of the fluid connection set of FIG. 1, wherein the collar is crimped in order to fix the open front end of the flexible hose to the connector.

Finally, the collar 5 is crimped (arrow F3) for fixing the open front end 2a of the flexible hose 2 to the connector 1 as illustrated on FIG. 3 and in dotted lines on FIGS. 5 and 9. In particular the collar 5 may be crimped by a manual action (clamp) or by appropriate automatic means.

In particular, in the method according to the invention the collar 5 may be engaged around the connector 1 before engaging the front end 2a of the hose on the tubular nozzle 3. This embodiment allows preventing the collar to be brought from the back of the hose 2.

Figure 4:
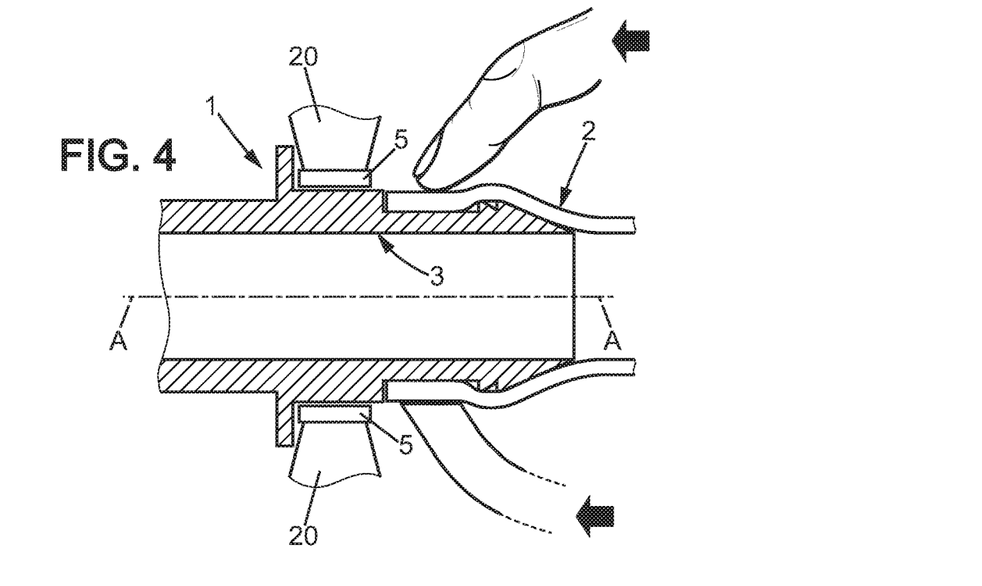
FIG. 4 is an axial cross-sectional view of the fluid connection set of FIG. 1 during the implementation of a variant of a method according to the invention for fixing in a sealed manner a flexible hose to a connector using a collar, wherein the collar is positioned around the connector by means of a jaw from an assembling machine.

In an embodiment of the method illustrated on FIGS. 5 and 4, an mounting machine may be used provided with a jaw 50 including the gripping fingers for implementing the method of clamping in the following way.

The collar 5 is grabbed using the jaw 50. Part of the connector 1 may also be grabbed, such as for example the connector body 10 by means of a second jaw of the mounting machine which is not illustrated.

Then, the collar 5 is engaged around the connector 10 by means of the jaw 50.

The jaw 50 then maintains the collar substantially coaxial with the temporary accommodation space 4 of the connector when the front end 2a of the hose is being engaged on the tubular nozzle 3.

Finally the collar is moved for placing the collar around at least part of the front end 2a of the hose and substantially in regard to the clamping area 13 of the connector by means of the jaw 50. Of course, the collar 5 may also be maintained at a fixed position and the connector together with its flexible tube already inserted therein may be moved.

According to the chosen type of collar, clamping the collar by pressing at least one lug of the collar in the case of a lug collar may be performed, or by tensioning the collar in the case of a multi-crimp collar, i.e. an inward radial contraction.

In this last embodiment of the method, the collar 5 may be a multi-crimp collar, and in particular a collar without lugs.

The clamping collar may however also be a metallic collar with one or more lug(s) provided for clamping. The clamping lug(s) is(are) then preferably positioned angularly distant from each of the gripping fingers of the jaw 50.

Then a clamp tool is used for pressing the lug shape in order to reduce the diameter of the ring formed by the clamping collar 5. In fact, the clamping collar 5 then has a diameter smaller than that of the outer surface of the flexible hose 2 at rest, it therefore applies an inward radial pressure.

It should be noted that it is possible to use several collars 5 side-by-side for the clamping function.

Likewise should be noted that for example L1=90% of L0, or L1=75% of L0, or even L1=⅔ of L0 can be chosen as illustrated in FIG. 10, or even L1=50% of L0.

The invention claimed is:

1. A fluid connection set comprising a connector, a flexible hose with an open front end, and a crimping collar for fixing the front end of the flexible hose to the connector, the connector including
    a connector body,
    a tubular nozzle able to receive the front end of the hose, the tubular nozzle including one or more retaining radial projections of the hose as well as a clamping area where the hose is clamped between the clamping area and the collar in a crimped configuration of the collar, and
    a temporary accommodation space axially interposed between the tubular nozzle and the connector body, the temporary accommodation space being separated from the clamping area,
wherein
    the front end of the hose is engaged on the tubular nozzle, in order to circumferentially surround the retaining radial projections and at least part of the clamping area,
    in a non-crimped configuration of the collar in which the collar surrounds the temporary accommodation space, the front end of the hose has a first outer diameter D1 at the location of the clamping area and a second outer diameter D2 outside the clamping area, at the location of the retaining radial projections, the first outer diameter D1 being smaller than the second outer diameter D2,
    the temporary accommodation space has maximum radial size D3, and
    the collar at rest prior to crimping has an inner diameter D0,
and wherein
    the first outer diameter D1 and the maximum radial size D3 are smaller than or equal to the inner diameter D0, and
    the second outer diameter D2 is larger than or equal to the inner diameter D0,
    whereby the temporary accommodation space allows at least partially housing the collar prior to inserting the hose,
    wherein the clamping area has an axial length L2 larger than or equal to an axial length L0 of the collar and is ended at a first axial end by the retaining radial projections and at a second axial end by an abutting axial shoulder for abutment of the hose.

2. The set according to claim 1, wherein a gap between the first outer diameter D1 and the inner diameter D0 is smaller than 15% of the inner diameter D0.

3. The set according to claim 1, wherein a flange ring separates the temporary accommodation space from the connector body, the flange ring having a fourth outer diameter D4 larger than the inner diameter D0.

4. The set according to claim 1, wherein the temporary accommodation space has an axial length L1 larger than or equal to an axial length L0 of the collar.

5. The set according to claim 4, wherein the temporary accommodation space is separated from the clamping area by an auxiliary flange ring having a fifth outer diameter D5 larger than the maximum radial size D3 of the temporary accommodation space and smaller than the inner diameter D0.

6. The set according to claim 1, wherein the temporary accommodation space has an axial length L1 smaller than an axial length L0 of the collar.

7. The set according to claim 6, wherein the axial length L1 is larger than 50% of the axial length L0.

8. The set according to claim 6, wherein the axial length L1 is larger than 75% of the axial length L0.

9. The set according to claim 6, wherein the axial length L1 is larger than 90% of the axial length L0.

10. The set according to claim 1, wherein the maximum radial size D3 of the temporary accommodation space is larger than or equal to the first outer diameter D1.

11. The set according to claim 1, wherein the collar is metallic and is either multi-crimp collar or a lug collar.

12. The set according to claim 1, wherein a gap between the first outer diameter D1 and the inner diameter D0 is 10% of the inner diameter D0.

13. The set according to claim 1, wherein the clamping area has a maximum outer diameter D30 smaller than the maximum outer diameter D31 of the retaining radial projections.

14. The set according to claim 1, wherein the clamping area has a smooth cylinder surface.

15. A fluid connection set comprising a connector, a flexible hose with an open front end, and a crimping collar for fixing the front end of the flexible hose to the connector, the connector including
    a connector body,
    a tubular nozzle able to receive the front end of the hose, the tubular nozzle including one or more retaining radial projections of the hose as well as a clamping area of the hose, and
    a temporary accommodation space axially interposed between the tubular nozzle and the connector body,
wherein
    the front end of the hose is engaged on the tubular nozzle, in order to circumferentially surround the retaining radial projections and at least part of the clamping area,
    the front end of the hose has a first outer diameter D1 at the location of the clamping area and a second outer diameter D2, at the location of the retaining radial projections, the first outer diameter D1 being smaller than the second outer diameter D2,
    the temporary accommodation space has maximum radial size D3, and
    the collar at rest prior to crimping has an inner diameter D0,
wherein
    the first outer diameter D1 and the maximum radial size D3 are smaller than or equal to the inner diameter D0, and
    the second outer diameter D2 is larger than or equal to the inner diameter D0,
    whereby the temporary accommodation space allows at least partially housing the collar prior to inserting the hose,
    wherein the temporary accommodation space has an axial length L1 larger than or equal to an axial length L0 of the collar, and
    wherein the temporary accommodation space is separated from the clamping area by an auxiliary flange ring having a fifth outer diameter D5 larger than the maximum radial size D3 of the temporary accommodation space and smaller than the inner diameter D0.

16. A fluid connection set comprising a connector, a flexible hose with an open front end, and a crimping collar for fixing the front end of the flexible hose to the connector, the connector including
a connector body,
a tubular nozzle able to receive the front end of the hose, the tubular nozzle including one or more retaining radial projections of the hose as well as a clamping area where the hose is clamped between the clamping area and the collar in a crimped configuration of the collar, and
a temporary accommodation space axially interposed between the tubular nozzle and the connector body, the temporary accommodation space being separated from the clamping area,
wherein
the front end of the hose is engaged on the tubular nozzle, in order to circumferentially surround the retaining radial projections and at least part of the clamping area,
in a non-crimped configuration of the collar in which the collar surrounds the temporary accommodation space, the front end of the hose has a first outer diameter D1 at the location of the clamping area and a second outer diameter D2 outside the clamping area, at the location of the retaining radial projections, the first outer diameter D1 being smaller than the second outer diameter D2,
the temporary accommodation space has maximum radial size D3, and
the collar at rest prior to crimping has an inner diameter D0, and
wherein
the first outer diameter D1 and the maximum radial size D3 are smaller than or equal to the inner diameter D0, and
the second outer diameter D2 is larger than or equal to the inner diameter D0,
whereby the temporary accommodation space allows at least partially housing the collar prior to inserting the hose, and
wherein the temporary accommodation space comprises one or more beads able to be in contact with the collar.

17. The set according to claim 16, wherein the beads define a maximum radial size D3 substantially equal to the inner diameter D0.

18. A method for fixing a flexible hose in a sealed manner to a connector using a crimping collar,
wherein the following is provided:
a flexible hose with an open front end,
a connector including
a connector body,
a tubular nozzle able to receive the front end of the hose, the tubular nozzle including retaining radial projections of the hose as well as a clamping area where the hose is clamped between the clamping area and the collar in a crimped configuration of the collar of, and
a temporary accommodation space arranged between the tubular nozzle and the connector body and having a maximum radial size D3, and
a crimping collar for fixing the front end of the flexible hose to the connector, the collar at rest prior to crimping having an inner diameter D0, and wherein:
the collar is engaged around the connector by the tubular nozzle until the collar circumferentially surrounds at least partially the temporary accommodation space, in a non-crimped configuration of the collar,
the front end of the hose is engaged around the tubular nozzle of the connector until said front end circumferentially surrounds the retaining radial projections and at least part of the clamping area, the front end of the hose having, in the non-crimped configuration of the collar in which the collar surrounds the temporary accommodation space, a first outer diameter D1 at the location of the clamping area and a second outer diameter D2 at the location of the retaining radial projections that extend outside the clamping area, the first outer diameter D1 being smaller than the second outer diameter D2, the first outer diameter D1 and the maximum size D3 being smaller than or equal to the inner diameter D0, and the second outer diameter D2 being larger than or equal to the inner diameter D0,
the collar or the connector is moved in a given position in order to position the collar around at least part of the front end of the hose and substantially opposite the clamping area of the connector, without being moved at the location of the retaining radial projections, and
the collar in the given position is crimped for fixing the open front end of the flexible hose to the connector with the clamping area having an axial length L2 larger than or equal to an axial length L0 of the collar and is ended at a first axial end by the retaining radial projections and at a second axial end by an abutting axial shoulder for abutting the hose.

19. The method according to claim 18, wherein
the collar is engaged around the connector by means of a jaw,
the jaw maintains the collar substantially coaxial with the temporary accommodation space of the connector while the front end of the hose is being engaged on the tubular nozzle, and
the collar or the connector is moved in order to position the collar around at least part of the front end of the hose and substantially opposite the clamping area of the hose by means of the jaw.

20. The method according to claim 19, wherein the collar is a multi-crimp metallic collar, specifically a collar without lugs.

* * * * *